235-380 SR

12/18/79 XR 4,179,686

United States Patent [19]

Bonicalzi et al.

[11] 4,179,686

[45] Dec. 18, 1979

[54] SYSTEM FOR CHECKING THE AUTHENTICITY OF IDENTIFICATION PAPERS

[76] Inventors: Maria P. Bonicalzi, via Rovere 15; Mario M. De Gasperi, Vic. Ciovasso 11, both of Milan, Italy

[21] Appl. No.: 847,906

[22] Filed: Nov. 2, 1977

[30] Foreign Application Priority Data

Nov. 3, 1976 [IT] Italy ........................ 29011 A/76[U]

[51] Int. Cl.[2] ............................................ G06K 9/00

[52] U.S. Cl. .......................... 340/146.3 AG; 235/380; 340/149 A; 340/146.3 Q; 356/71

[58] Field of Search ................. 235/380; 340/146.3 E, 340/146.3 B, 146.3 R, 146.3 AG, 146.3 G, 146.3 Q, 149 R, 149 A; 250/226; 356/71

[56] References Cited

U.S. PATENT DOCUMENTS 3,805,238 4/1974 Rothfjell ....................... 340/146.3 E 4,016,405 4/1977 McCune et al. .................... 235/380

4,075,604 2/1978 De Gasperi .................. 340/146.3 B

OTHER PUBLICATIONS

Kelley, "Photo-Protected Credit Card", *IBM Tech. Disclosure Bulletin*, vol. 20, No. 11A, Apr. 1978, p. 4596.

*Primary Examiner*—Leo H. Boudreau

*Attorney, Agent, or Firm*—Fidelman, Wolffe & Waldron

[57] ABSTRACT

Typical image parameters of the image of a person to be identified are determined as reproduced on or applied to the identification medium and stored in memory; then, the paper authenticity is checked in a suitable apparatus which redetermines the image parameters on the paper and compares such redetermined parameters with the previously stored ones, supplying a signal of positive or negative check at comparison completion. In addition, a code corresponding to the image is reproduced on or applied to the same identification medium and is also checked for authenticity and serves as a double check of the legitimate bearer of the medium.

4 Claims, 5 Drawing Figures

SYSTEM FOR CHECKING THE AUTHENTICITY OF IDENTIFICATION PAPERS

This invention relates to a system for checking the authenticity of identification papers.

For purposes of the present invention, the term "system" is meant to incorporate both the apparatus and steps followed for checking the authenticity of an indentification paper.

In the general field for recognizing images, particularly for recognizing persons, different systems have been studied and designed, such systems scanning the image either according to its contours, or by dots. In these systems, a possible means of image identification involves the step of storing a very large amount of data corresponding to the contours or dots being scanned. The practical impossibility of having hugh storing means or memories, have prevented these systems from being used for normal identification of images—particularly for checking the authenticity of personal identity papers, such as credit cards, papers for recognition of persons within firms, and the like.

To illustrate the present invention, reference will be made hereinafter to the problem of checking the authenticity of credit cards, or the like. It is to be understood that the system according to this invention could be adopted for checking the authenticity of any identification paper.

It is well known that to avoid counterfeiting of credit cards, use has been made of special materials and marks. Moreover, to avoid use of credit cards by those who are not legitimate card holders, a photo has been applied for visually recognizing a legitimate card holder at the time of using the credit card. However, after some investigation, even the most complicated of prior systems are liable to counterfeiting. These prior systems particularly permit the preparation of credit cards or such identity papers, the authenticity of which is hardly verifiable.

Therefore, it is the object of the present invention to provide a system permitting not only a visual comparison between the image or photo on a credit card and the holder of that credit card, but also a check of the authenticity of the credit card by other means.

According to the invention (an improvement of U.S. Pat. No. 4,075,604), the foregoing has been accomplished by a system wherein an identification card is provided with the image or photo of the person to whom the card legitimately belongs and a code of the image, comprising characteristic parameters of the image. By use of a suitable control apparatus at the time of card use, the authenticity of the card holder is verified by scanning the image, thereby redetermining the characteristic parameters of the image and comparing the same with the parameters of the corresponding code. A signal is emitted in accordance with a positive or negative check of the card.

The invention will now be illustrated in further detail with reference to the accompanying drawings, in which.

Figure 1:
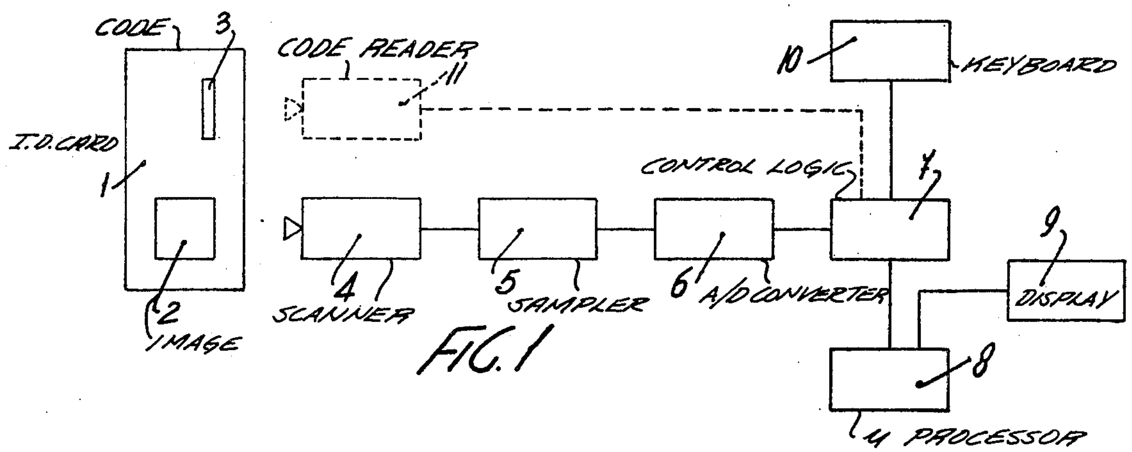
FIG. 1 is a block diagram showing the system according to the invention.

A general scheme of the system for checking the authenticity of identification papers according to the invention is shown in FIG. 1.

In FIG. 1, reference numeral 1 designates a general identification paper such as a credit card. In addition to the personal data of the person to whom such a card belong, such as full particulars and various indications, the card includes an image or picture 2, (for example, an image or picture of the legitimate holder of the card). Such an image can be of any form, such as a positive photographic black and white image, but could also be a photographic color image or a transparency, or the like.

In the example shown, card 1 is also provided with a code 3 relating to the characteristic parameters of image 2.

Instead of a code being stored on the card, the code could be provided in a suitable separate memory and a cross-reference indication of the stored code could be provided on the card. This second method of coding can be practically useful in cases where the locations at which the document or paper authenticity is checked (and hence a person's identification is verified) are few in number and/or are readily connectable with a code storing center.

With further reference to FIG. 1, numeral 4 indicates a general apparatus for scanning image 2 on card 1. Optionally, by adding suitable filters (not shown), the apparatus is capable of resolving image 2 into its chromatic components. Image scanning apparatus 4 is connected with a sampler 5 providing for separating or dividing the image into spots or dots, for each of which a given value of an analog luminance level signal is obtained.

In the specific case, said scanning apparatus is a black and white television camera, in front of which the paper image to be scanned is placed. The television camera takes the image under examination and translates the luminance information into corresponding electric signals. Of course, due to the nature of the television camera, the complete description of the image, or half-frame, is periodically repeated at the frequency of 50 Hz until the image to be scanned remains in position.

The electric signals from television camera 4, corresponding to a preselected amount of half-frames, are supplied to sampling circuit 5, wherein the image is discreted or divided as above specified.

Instead of said television camera 4 and sampling circuit 5, any image scanning and dividing apparatus could be used, such as a photodiode matrix, or a photodiode bar through a relative movement between the bar and image to be scanned.

Other systems also could be used, for example, a flying spot system. Scanning by laser emitter and transmission of the analog signal by a photomultiplier also could be used.

The output of sampling circuit 5 is supplied to an analog/digital converting circuit 6 which in turn is connected to a control logic block 7. Sampling and converting circuits per se are well known. For example, they can be of the type marketed as VVHS and NADC-8 by DDC, thus not requiring any detailed description.

It should be noted that the same information appears at the output of converting circuit 6 as at the output of television camera 4, but now in digital instead of analog form.

In the case shown, image dividing and sampling operations are effected as follows: image 2 is scanned by television camera 4 according to parallel lines transversely of the image. The television camera repeatedly scans the image, when the latter is held stationary, and particularly 50 times a second (fifty half-frames). In order to operate at proper speeds for processor 8, a plurality of half-frames are used for scanning the whole image which, in addition to being divided into transverse lines, is ideally divided into columns perpendicular to said lines. At each half-frame (total television scanning of the image), only one column is scanned, so that the analog signal of luminance rate is detected on only one spot by line. For the scanning of a whole image, as many half-frames are used as the columns into which the image is ideally divided.

Converting circuit 6 is connected through a control logic 7 to a microprocessor 8, serially supplying thereto the signals corresponding to the luminance levels of each sampled spot of image 2. Such a microprocessor 8 is, for example, of the 16 bit type marketed by Digital Equipments Corporation as LS1-11 with KD-11 and MRV-11 type of storing and programming fittings and DRV-11 interface.

This microprocessor is also connected to an alphanumeric display 9. A manual control keyboard 10 for inletting code 3 is connected to the microprocessor through control block 7. As an alternative to manual inletting of code 3 by keyboard 10, a code reader 11 may be provided, as outlined by dashed lines in FIG. 1.

Microprocessor 8 is suitably programmed to serially receive, through control logic 7, the digital luminance signals of each of the image spots for determining the characteristic parameters of the image. Such a determination is carried out as hereinafter shown with reference to FIGS. 2 and 3 of the accompanying drawings.

Figure 2:
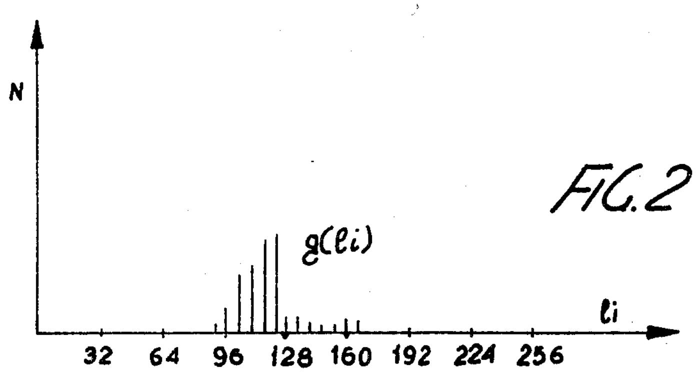
FIG. 2 is a diagram showing the distributing function for the frequencies of luminance levels of the image of the identification paper for determining the characteristic parameters.
Figure 3:
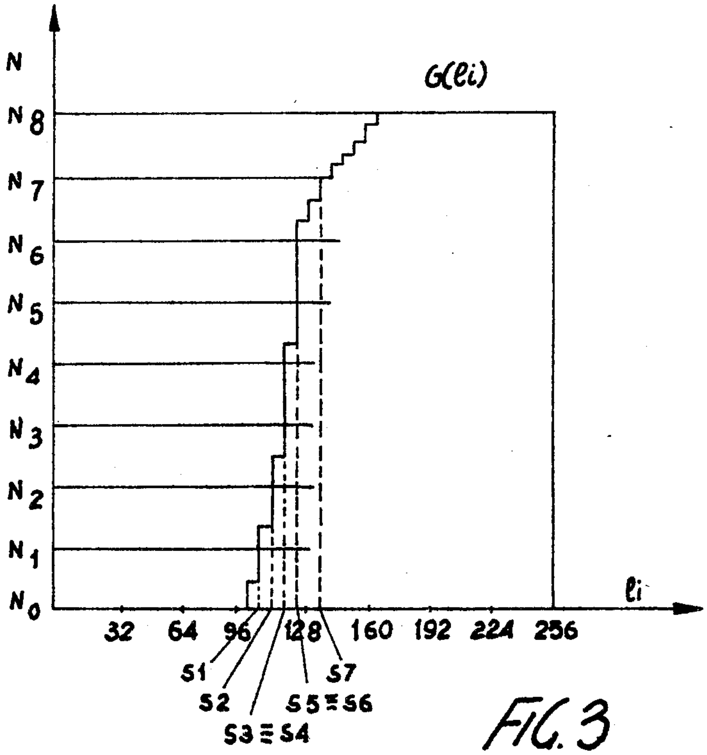
FIG. 3 shows the diagram for the stored frequencies of the luminance levels as used for calculating the characteristic parameters of the function of FIG. 2.

More particularly, said microprocessor 8 is programmed to generate a function g(li) for the distribution of the frequencies of the image luminance levels, as shown for example in FIG. 2. The frequencies or number N of spots (signals) are given on the ordinate, and the luminance levels "li" are given on the abscissa of the coordinate system. This microprocessor 8 is also programmed for calculating the characteristic parameters of function g(li) of distribution of the luminance levels of FIG. 2, For example, by integrating function g(li), the integrated function G(li) of the stored up frequencies is derived as shown in FIG. 3. On the ordinate of FIG. 3 is indicated the number N of spots (signals) having a luminance level equal to or lower than the luminance level "li" that is shown on the abscissa.

To calculate the characteristic parameters of the image, function G(li) is divided on the ordinate axis into X number of like parts, for example, into eight parts as indicated by ordinate values $N_0$–$N_8$, obtaining corresponding parameter values ($S_0$–$S_7$) on the abscissa (referred to as "octiles" when dividing into eight parts and neglecting the extreme values). Such values constitute the characteristic parameters of image 2.

It should be discriminated whether the scanning being carried out is the first scanning which is effected in preparing the paper to be used with the system according to the invention, or a subsequent scanning for checking the authenticity of the paper. In the former, or in any case where reading of the stored characteristic parameters of the image is desired, such parameters are serially read from microprocessor 8 to display 9. Such parameters defining code 3 either are stored on paper 1, or are introduced into a separate memory.

Should the scanning be related to the paper (with photo and code) authenticity check, or a correspondence between the photo and a stored code, microprocessor 8 compares the parameters as redetermined from image 2 and the parameters of a stored code that has to be deliberately introduced by the operator through keyboard 10, or automatically introduced through code reader 11. For example, the comparison between parameters may be accomplished by adding the squares of the individual differences between corresponding parameters. In turn, the result of this sum is compared in said microprocessor with a predetermined threshold value. When the result of said sum is lower than the threshold value, microprocessor 8 indicates a signal of positive check, for the authenticity of the paper, on display 9. When the result of the comparison between the parameters is higher than the preset threshold value, microprocessor 8 emits a signal of negative check, indicating the non-authenticity of the paper by way of display 9.

Figure 4:
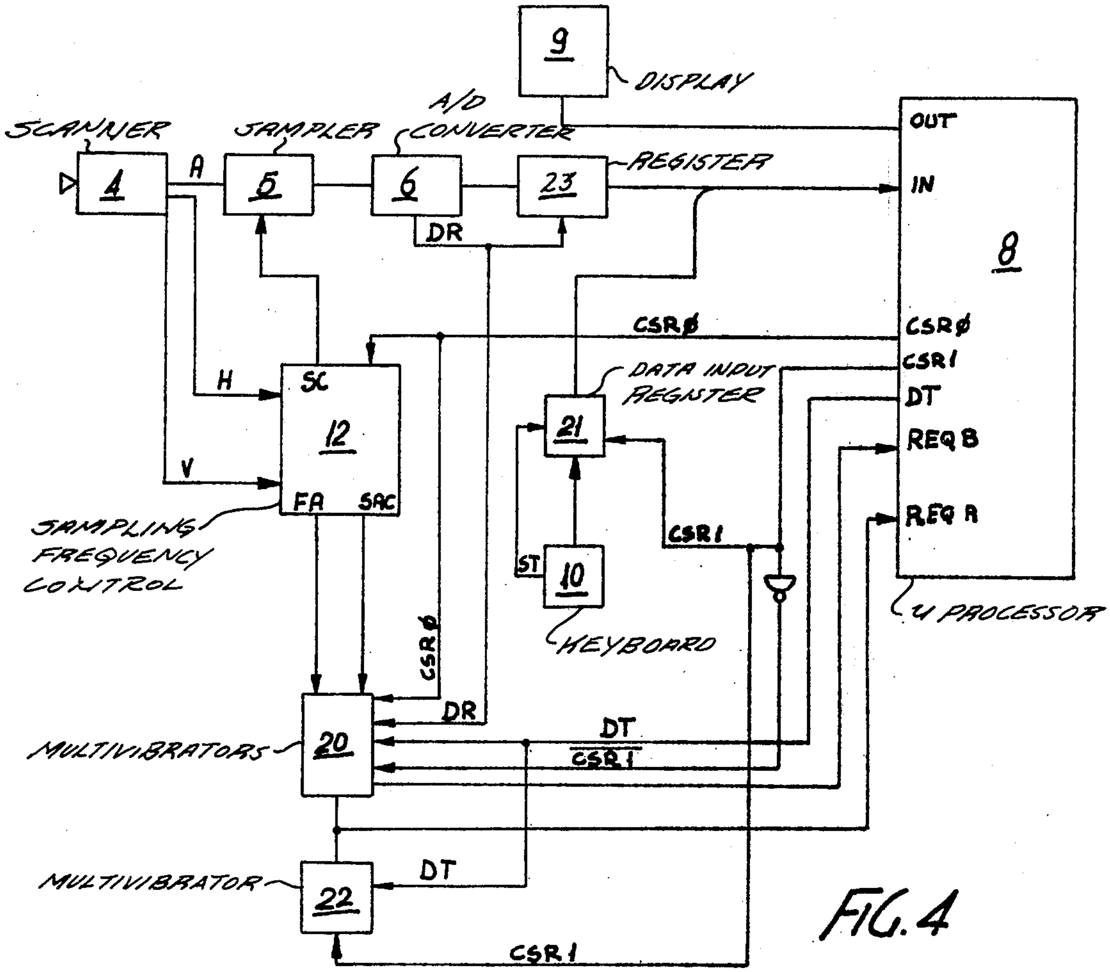
FIG. 4 is a detailed block diagram showing the control portion of the scheme shown in FIG. 3.
Figure 5:
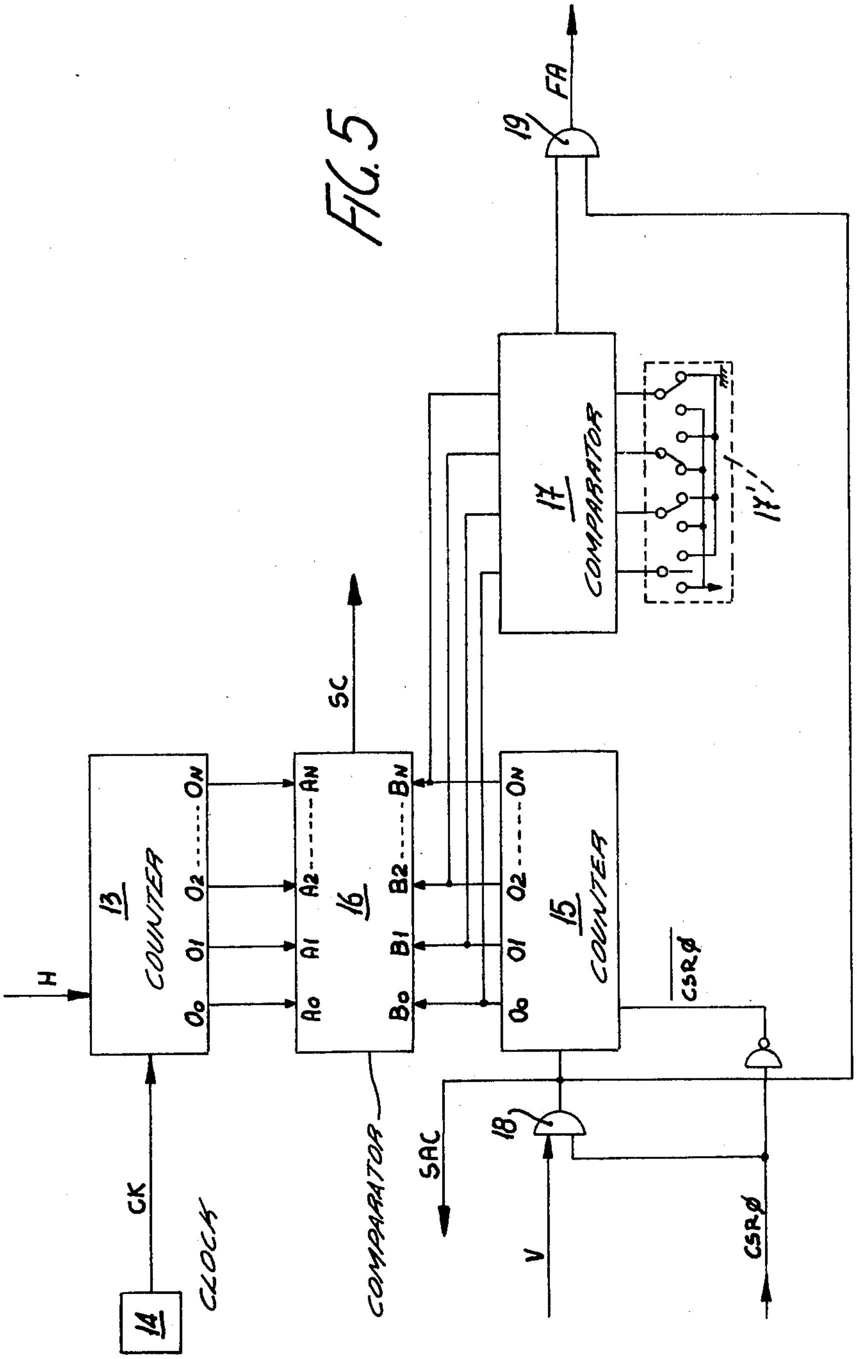
FIG. 5 is a block diagram showing the sampling frequency control of FIG. 4 in more detail.

Referring to FIGS. 4 and 5, an embodiment of the apparatus according to the invention will be particularly described.

In FIG. 4, television camera 4 supplies an analog signal relating to the scanned image to sampler 5, and also supplies signals H of horizontal synchronism and signals V of vertical synchronism to a circuit 12 controlling the sampling frequency, as shown in detail in FIG. 5. The sampled signals outputted from circuit 5 are fed to an analog-digital converting circuit 6, then to a register 23 comprising a set of bistable multivibrators, each bit of data being fed therefrom to the imputs of microprocessor 8 at the time a pulse DR arrives from converter 6.

Sampler 5 is gated by a signal SC, having the duration for a half-frame of television camera 4, from block 12 that is controlling the sampling frequency. Block 12 is shown in more detail in FIG. 5, and comprises a first counter 13 for receiving signal H of horizontal synchronism of the television camera and for receiving a signal CK of a quartz clock 14 (the oscillation period of which defines the number of sampling columns into which the image is ideally divided). Counter 13 counts signals CK and is reset by television camera pulse H at the beginning of each line. Therefore, counter 13 counts, for each line, the columns into which the image to be scanned is ideally divided.

Block 12 also comprises a second counter 15 which is incremented at each pulse V provided by the television camera at each half-frame, and thus maintains on its outputs the same number for the entire half-frame. The comparison between the outputs of counter 13 and counter 15 is accomplished in a first comparator 16, which supplies sampling pulse SC to sampler 5 for gating thereof. The outputs of second counter 15 are fed also to a second comparator 17, which compares the output number from counter 15 with a number corresponding to the image division column number, this number being provided by a set of grounded switches shown at 17'. Comparator 17 accomplishes the function of signaling when frame counter 15 has reached the number corresponding to the last column of the image division. In this case, the arrival of a signal V from the television camera, concurrently with a signal CSRϕ from microprocessor 8, causes the output signal of gate 18 to be fed to the input of a second gate 19, so that signal FA is supplied to block 20 of FIG. 4, indicating that the image sampling has been completed.

At each arrival of a signal V to an input of gate 18 (the other input of which is at logic level 1 due to signal CSRϕ), counter 15 (gated by CSRϕ) is incremented by one unit. Additionally, the output of gate 18 (in the form of a signal SAC) is supplied to block 20 to prevent the beginning of the image scanning at an intermediate location of the half-frame. Signal SAC gates block 20 to set the input line REQ A of microprocessor 8 at logic level 1, signaling the arrival of valid data from converter 6.

Block 20 comprises bistable multivibrators having a "tristate" output. The bistable multivibrators are gated by the logic signal $\overline{CSR1}$, so that when signal DR arrives from converter 6, a signal is supplied to the REQ A input of microprocessor 8 to signal the presence in register 23 of new data to be withdrawn. Correspondingly, at the arrival of signal FA from block 12, gating of the bistable multivibrators by logic signal $\overline{CSR1}$ causes a signal to be supplied on input REQ B of microprocessor 8 to indicate that image scanning has been completed. Signal REQ B also serves to inhibit further cutoff requests on input REQ A until arrival of a novel signal SAC from block 12. At each withdrawal of data from register 23, microprocessor 8 supplies a signal DT to block 20 resetting line REQ A to logic level ϕ. When microprocessor 8 outputs signal CSRϕ, (that is, when a new data acquisition is started), block 20 resets its own output REQ B to logic level ϕ.

As above explained, data from counter 13 (relating to luminance level values) are processed within microprocessor 8 for calculating the characteristic parameters of the image (octiles), as specified in connection with FIGS. 2 and 3. Once microprocessor 8 has calculated the characteristic parameters of the image to be scanned and initial coding is being carried out, the data from output OUT of microprocessor 8 is fed to display 9. Otherwise, when carrying out the paper authenticity check, such parameters are compared with the corresponding stored parameters (in the previously shown manner). These parameters can be introduced into microprocessor 8 both through code reader 11 of FIG. 1 and/or manually through keyboard 10 as hereinafter described.

Through keyboard 10, code 3 is entered (as read directly on paper 1) or recalled by suitable external memory. The data is supplied through a data input register 21 to the inputs IN of microprocessor 8 and stored in a comparison register therein. Data input register 21 comprises a number of bistable multivibrators having a "tristate" output. This register 21 receives the data from keyboard 10 and supplies such data to the inputs to microprocessor, as above specified, when a signal ST is emitted from keyboard 10 at the end of code setting, and when signal CSR1 from microprocessor 8 is at logic level 1. Signal CSR1 is also fed to block 22 comprising a single bistable multivibrator having a "tristate" output which, at the arrival of signal CSR1, sets line REQ A to logic level 1 indicating the presence on register 21 of data to be withdrawn to microprocessor 8. Line REQ A is reset still by block 22 at the arrival of a signal DT.

Now, the comparison register of microprocessor 8 contains both the characteristic parameters for the outstanding scanning of a checking operation for the paper authenticity and the parameters comprising the comparison code. The microprocessor now provides for a comparison between said parameters, as above specified, and finally emits at output OUT a signal of positive or negative check, which is displayed on display 9.

From the foregoing and as shown on the accompanying drawings, it is therefore evident that by a system according to the present invention, it would be extremely difficult, if not impossible, to counterfeit any identification paper or use someone else's paper, even after replacement of image 2 on the paper.

The above disclosed system is generally valid independently of how the characteristic image parameters are calculated and the identification code is entered. However, it should be noted that where determination of the characteristic parameters is accomplished by the system shown in FIGS. 2 and 3, due to calculation simplicity and the relatively limited number of characteristic parameters required for code determination while maintaining a very high degree of check safety, use can be made of a checking apparatus of highly reduced overall size and dimensions, and hence of a low cost with the capability of a wide diffusion of the system.

What we claim is:

1. A system for checking the authenticity of identification papers, wherein the use is made of an identification paper provided with the image or photo of the person to be identified, comprising the steps of determining and storing an image code formed of characteristic parameters based on luminance levels of said image and checking the authenticity of the paper at the time of use in a suitable control apparatus by scanning the image thereon, providing for redetermining the characteristic parameters of the image, and comparing said redetermined parameters with the coded ones, upon which a signal of effected check is emitted.

2. A system according to claim 1, wherein said code is stored on the identification paper.

3. A system according to claim 1, wherein said code is stored separately from the paper.

4. A system according to claim 1, wherein the characteristic parameters of the code are automatically introduced into the control apparatus by direct reading from the identification paper.

* * * * *